W. W. PHILLEO & A. W. COX.

HARVESTER.

No. 191,711. Patented June 5, 1877.

Attest,
W. C. Corlies.
E. S. Lloyd.

Inventors,
William W. Philleo & Albert W. Cox.
By Coburn & Thacher
Attys.

UNITED STATES PATENT OFFICE.

WILLIAM W. PHILLEO AND ALBERT W. COX, OF HASTINGS, NEBRASKA, ASSIGNORS, BY MESNE ASSIGNMENTS, TO SANDWICH MANUFACTURING COMPANY, OF SANDWICH, ILLINOIS, AND THEODORE L. FRENCH, OF CEDAR FALLS, IOWA.

IMPROVEMENT IN HARVESTERS.

Specification forming part of Letters Patent No. 191,711, dated June 5, 1877; application filed April 14, 1877.

*To all whom it may concern:*

Be it known that we, WILLIAM W. PHILLEO and ALBERT W. COX, of Hastings, in the county of Adams and State of Nebraska, have invented a new and useful Improvement in Harvesters, which is fully set forth in the following specification, reference being had to the accompanying drawings, in which—

Figure 1:
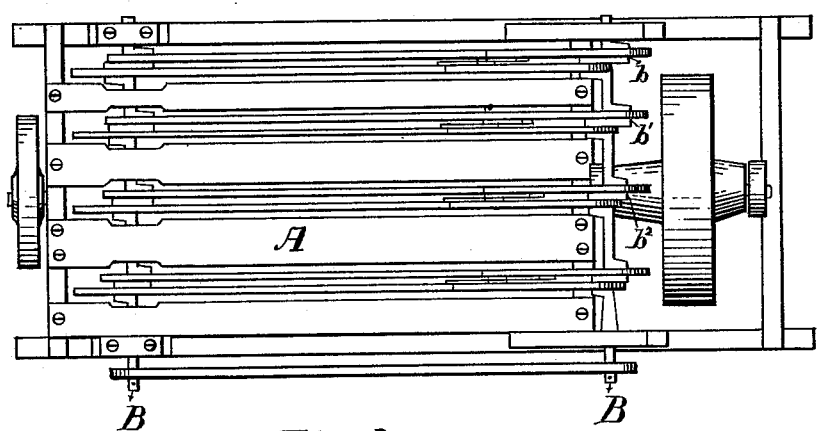
Figure 2:
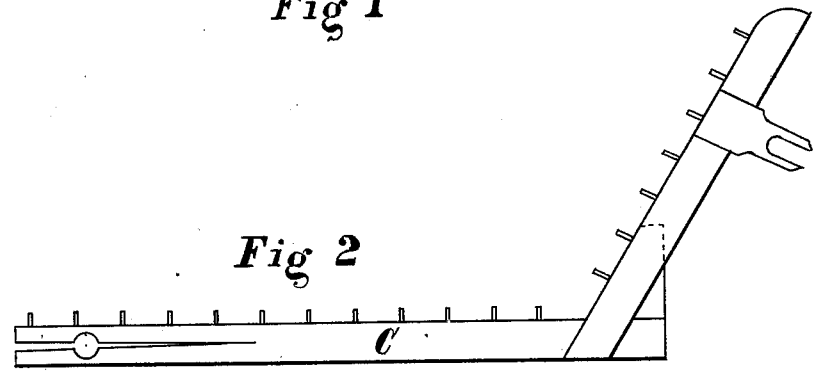
Figure 3:
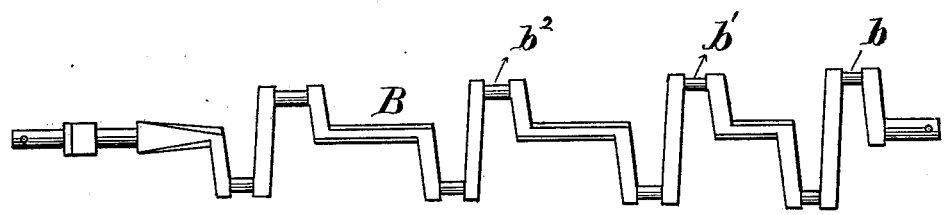

Figure 1 represents a plan view of a harvester with our improvement applied; Fig. 2, a side elevation of one of the toothed elevator-bars, and Fig. 3 a plan view of one of the crank-shafts on which the elevator-bars are mounted.

In that class of harvesting-machines in which the cut grain is elevated from the platform on which it falls, and is deposited in a receiver, considerable difficulty has been experienced from the fact that, the butts being usually heavier than the heads, the former will lag behind, unless some special contrivance is used to carry them up as rapidly as the heads, and thus keep the straw straight.

Our invention relates to this class of harvesting-machines, and particularly to machines in which the elevating device is like that for which Letters Patent of the United States were granted to Low and Adams, February 1, 1870, No. 99,451; and the object of the invention is to construct the elevating device in such a manner that the butts will be carried up faster than the heads, so that the grain will be kept and delivered in a comparatively straight condition.

The invention consists in making the cranks upon which the toothed elevating-bars are placed longest on the forward ends of the shafts, and gradually shortening the length of said cranks toward the rear of the machine.

In the drawings, A represents the slotted platform of a harvester of the Low and Adams type, and B B the crank-shafts for vibrating the elevating-bars. These shafts are mounted in the usual way, one on the horizontal or carrying frame and one on the elevator-frame. Each shaft B is provided with a series of cranks, and upon these cranks the angular bars C are mounted, the bars being ordinarily arranged in pairs, as shown in Fig. 1 of the drawings, and provided with teeth for carrying the cut grain forward and upward as they are vibrated by the rotation of the crank-shafts.

Instead of having the cranks on the shafts B all of the same length, which is the usual construction, we make the forward cranks $b$ longer than the others, and gradually reduce the length of said cranks from front to rear of the machine.

We have found that a reduction of about one-fourth of an inch in each pair is sufficient to accomplish the desired result—that is, the second set of cranks, $b^1$, proceeding from front to rear of the machine, should be one-fourth of an inch shorter than the cranks $b$, the third set, $b^2$, a fourth of an inch shorter than those immediately preceding, and so on.

This gradation is not arbitrary, however, as it may be changed somewhat without materially modifying the operation of the device.

It is evident that with this construction of the crank-shafts a greater range of motion is given to the vibrating toothed bars at the front of the machine than to any of the others, and that this range is gradually lessened toward the rear of the machine, the extreme rear bars having the least motion of all. The butts of the cut grain will, therefore, be carried forward across the platform and up the inclined elevator-frame more rapidly than the heads, and hence all lagging of the butts is prevented, and the grain is kept comparatively straight, and delivered in this condition to the binders or binding mechanism.

If only the forward cranks or the two front sets were longer than the others, the latter being of uniform length, the operation would be similar; but we prefer a uniform gradation of the entire series of cranks, as with this construction the operation is more satisfactory in all kinds and conditions of grain.

Having thus described our invention, what we claim as new, and desire to secure by Letters Patent, is—

1. The crank-shafts B, constructed with the forward cranks *b* longer than the others on the same shafts, in combination with the vibrating toothed bars C, substantially as and for the purpose set forth.

2. The shafts B, provided with a series of cranks, decreasing in length from front to rear of the machine by a regular gradation, in combination with the vibrating toothed elevator-bars C mounted thereon, substantially as and for the purpose described.

WILLIAM W. PHILLEO.
ALBERT W. COX.

Witnesses:
J. E. HUTCHINSON,
THOS. J. PARDOE.